US010960330B2

(12) United States Patent
Banju et al.

(10) Patent No.: US 10,960,330 B2
(45) Date of Patent: Mar. 30, 2021

(54) FILTRATION FILTER DEVICE

(71) Applicant: Murata Manufacturing Co., Ltd., Nagaokakyo (JP)

(72) Inventors: Masaru Banju, Nagaokakyo (JP); Junko Watanabe, Nagaokakyo (JP); Takashi Kondo, Nagaokakyo (JP); Shogo Tokoi, Nagaokakyo (JP); Yoshio Oda, Nagaokakyo (JP); Ayami Sawai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/227,340

(22) Filed: Dec. 20, 2018

(65) Prior Publication Data

US 2019/0118125 A1    Apr. 25, 2019

Related U.S. Application Data

(63) Continuation of application No. PCT/JP2017/025378, filed on Jul. 12, 2017.

(30) Foreign Application Priority Data

Aug. 10, 2016 (JP) .............................. JP2016-158019
Nov. 14, 2016 (JP) .............................. JP2016-221859

(51) Int. Cl.
 *B01D 35/30* (2006.01)
 *B01D 39/10* (2006.01)
 (Continued)

(52) U.S. Cl.
 CPC ............. *B01D 35/30* (2013.01); *B01D 29/05* (2013.01); *B01D 39/10* (2013.01);
 (Continued)

(58) Field of Classification Search
 CPC .... B01D 35/30; B01D 29/05; B01D 39/2051; B01D 39/10; G01N 1/4077; G01N 2001/4088
 (Continued)

(56) References Cited

U.S. PATENT DOCUMENTS 5,208,161 A    5/1993 Saunders et al.
5,269,917 A   12/1993 Stankowski
 (Continued)

FOREIGN PATENT DOCUMENTS

JP    S5287183 U    6/1977
JP    S5728772 U    2/1982
 (Continued)

OTHER PUBLICATIONS

International Search Report issued in PCT/JP2017/025378, dated Oct. 17, 2017.
 (Continued)

*Primary Examiner* — Madeline Gonzalez
(74) *Attorney, Agent, or Firm* — Arent Fox LLP

(57) ABSTRACT

A filtration filter device that includes a filtration filter that filters an object to be filtered that a fluid contains, and a holding member that holds an outer circumferential portion of the filtration filter. An annular projecting portion that projects in a thickness direction of the holding member and that defines a channel through which the fluid flows is formed on one main surface of the holding member. A recessed portion that is recessed in the thickness direction of the holding member and that has an inner diameter larger than an inner diameter of the projecting portion is formed on the other main surface of the holding member. The filtration filter is disposed inside the projecting portion of the holding member.

15 Claims, 15 Drawing Sheets

(51) Int. Cl.
　　G01N 1/40　　(2006.01)
　　B01D 29/05　　(2006.01)
　　B01D 39/20　　(2006.01)
(52) U.S. Cl.
　　CPC ....... B01D 39/2051 (2013.01); G01N 1/4077 (2013.01); *G01N 2001/4088* (2013.01)
(58) Field of Classification Search
　　USPC .............................. 210/445, 435, 439, 446
　　See application file for complete search history.

(56) References Cited

U.S. PATENT DOCUMENTS

| | | | |
|---|---|---|---|
| 5,443,723 A | 8/1995 | Stankowski et al. | |
| 5,556,598 A | 9/1996 | Raybuck et al. | |
| 5,798,041 A | 8/1998 | Zuk | |
| 5,833,927 A | 11/1998 | Raybuck et al. | |
| 5,938,940 A | 8/1999 | Zuk | |
| 6,030,539 A | 2/2000 | Zuk | |
| 6,274,055 B1 | 8/2001 | Zuk | |
| 10,569,203 B2 * | 2/2020 | Banju | B01D 63/08 |
| 2003/0192363 A1 * | 10/2003 | Adiletta | B01D 46/543 73/28.04 |
| 2015/0129769 A1 | 5/2015 | Kamba et al. | |
| 2016/0041075 A1 | 2/2016 | Kamba et al. | |
| 2016/0054223 A1 | 2/2016 | Kamba et al. | |

FOREIGN PATENT DOCUMENTS

| | | |
|---|---|---|
| JP | S6177043 U | 5/1986 |
| JP | S6392642 U | 6/1988 |
| JP | H01142839 U | 9/1989 |
| JP | H01150950 U | 10/1989 |
| JP | H0225006 U | 2/1990 |
| JP | H03500003 A | 1/1991 |
| JP | H03109043 U | 11/1991 |
| JP | H0461904 A | 2/1992 |
| JP | H04329965 A | 11/1992 |
| JP | H067648 A | 1/1994 |
| JP | H0613850 U | 2/1994 |
| JP | H0679110 A | 3/1994 |
| JP | H06315603 A | 11/1994 |
| JP | H08304370 A | 11/1996 |
| JP | H09509361 A | 9/1997 |
| JP | H11285607 A | 10/1999 |
| JP | H11513298 A | 11/1999 |
| JP | 2001129079 A | 5/2001 |
| JP | 2003245342 A | 9/2003 |
| JP | 2004337287 A | 12/2004 |
| JP | 2004345195 A | 12/2004 |
| JP | 2005034205 A | 2/2005 |
| JP | 2006149635 A | 6/2006 |
| JP | 2006280483 A | 10/2006 |
| JP | 2007054212 A | 3/2007 |
| JP | 2007190406 A | 8/2007 |
| JP | 2007304016 A | 11/2007 |
| JP | 2011041679 A | 3/2011 |
| JP | 2014098661 A | 5/2014 |
| WO | 2014017430 A1 | 1/2014 |
| WO | 2014192917 A1 | 12/2014 |

OTHER PUBLICATIONS

Written Opinion of the International Searching Authority issued in PCT/JP2017/025378, dated Oct. 17, 2017.

* cited by examiner

FILTRATION FILTER DEVICE

CROSS REFERENCE TO RELATED APPLICATIONS

The present application is a continuation of International application No. PCT/JP2017/025378, filed Jul. 12, 2017, which claims priority to Japanese Patent Application No. 2016-158019, filed Aug. 10, 2016, and Japanese Patent Application No. 2016-221859, filed Nov. 14, 2016, the entire contents of each of which are incorporated herein by reference.

FIELD OF THE INVENTION

The present invention relates to a filtration filter device that filters an object contained in a fluid.

BACKGROUND OF THE INVENTION

International Publication No. 2014/017430 (Patent Document 1) discloses a filtration filter device that filters an object contained in a fluid and includes a filtration filter and a holding member that holds an outer circumferential portion of the filtration filter.

In the filtration filter device in Patent Document 1, it is necessary for the filtered object left on the filtration filter to be observed with, for example, a microscope from the perspective of activity and form. However, it is difficult to clearly observe the filtered object in the existing filtration filter device as disclosed in Patent Document 1 because the distance from a fluid supply port to the filtration filter is longer than the focal length of the microscope. In addition, measurement of the characteristics of the filtered object after drying is a prerequisite for the existing filtration filter device as disclosed in Patent Document 1. Accordingly, a space that is defined by the filtration filter and the holding member is designed to be small. In particular, when the object to be filtered is a biological substance, there is a problem in that moisture in the filtered object is lost and the activity thereof is lost during observation.

It is an object of the present invention to solve the above problem and provide a filtration filter device that enables the filtered object left on the filtration filter to be more successfully observed.

BRIEF SUMMARY OF THE INVENTION

To achieve the above object, a filtration filter device according to an embodiment of the present invention includes a filtration filter that filters an object to be filtered that a fluid contains, and at least one holding member that holds an outer circumferential portion of the filtration filter. An annular projecting portion that projects in a thickness direction of the at least one holding member and that defines a channel through which the fluid flows is formed on one main surface of the at least one holding member. A recessed portion that is recessed in the thickness direction of the at least one holding member and that has an inner diameter larger than an inner diameter of the projecting portion is formed on the other main surface of the at least one holding member. The filtration filter is disposed inside the projecting portion of the at least one holding member.

The filtration filter device according to the embodiment of the present invention enables the filtered object left on the filtration filter to be more successfully observed.

DESCRIPTION OF THE PREFERRED EMBODIMENTS

Figure 1:
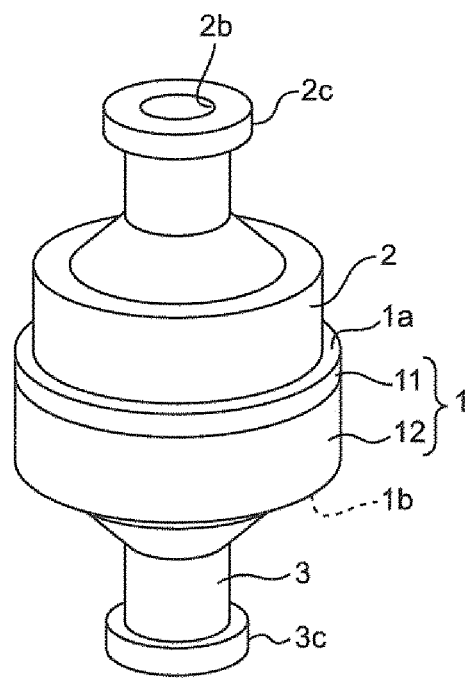
FIG. 1 schematically illustrates a perspective view of the structure of a filtration filter device according to a first embodiment of the present invention.

The present inventors have seriously considered how to more successfully observe an filtered object left on a filtration filter and have acquired the following knowledge.

The existing filtration filter device uses two annular resin jigs having the same thickness as the holding member. The filtration filter is interposed between the two resin jigs to hold an outer circumferential portion of the filtration filter. That is, the filtration filter is disposed at the middle position of the holding member in the thickness direction.

However, the present inventors have found that the filtered object left on the filtration filter can be more successfully observed in a manner in which the filtration filter is disposed so as to shift to a fluid supply side or discharge side in the thickness direction of the holding member. That is, in the case where the filtration filter is located on the fluid supply side, the focus of the microscope can be readily adjusted when the filtered object left on the filtration filter is observed with, for example, an electron microscope. For example, in some cases where the filtered object left on the filtration filter is observed with an optical microscope from the fluid supply side with the filtration filter located on the fluid discharge side, an objective lens of the optical microscope is focused on the holding member, and the filtered object cannot be clearly observed. However, in the case where the filtration filter is located on the fluid supply side, focus can be readily adjusted when the filtered object left on the filtration filter is observed with the electron microscope from the fluid supply side. In the case where the filtration filter is located on the fluid discharge side, the volume of a space that is surrounded by the holding member and the filtration filter can be expanded. For example, in the case where the object to be filtered is a substance that is activated when immersed in a liquid, when the liquid is put in the space, the filtered object is activated and floats in the liquid, and the state thereof can be observed. In addition, putting the liquid in the space prevents the filtered object from drying.

The present inventors have accomplished the following invention on the basis of the knowledge that is newly acquired.

A filtration filter device according to an embodiment of the present invention includes a filtration filter that filters an object to be filtered that a fluid contains, and at least one holding member that holds an outer circumferential portion of the filtration filter. An annular projecting portion that projects in a thickness direction of the at least one holding member and that defines a channel through which the fluid flows is formed on one main surface of the at least one holding member. A recessed portion that is recessed in the thickness direction of the at least one holding member and that has an inner diameter larger than an inner diameter of the projecting portion is formed on the other main surface of the at least one holding member. The filtration filter is disposed inside the projecting portion of the at least one holding member.

With this structure, the filtration filter is disposed inside the projecting portion of the holding member, and consequently, the filtration filter is located on the fluid supply side or discharge side. That is, in the case where a fluid channel that is defined by the projecting portion is a fluid supply channel, the filtration filter is located on the fluid supply side. Consequently, focus can be readily adjusted when the filtered object left on the filtration filter is observed with, for example, an electron microscope. In the case where the fluid channel that is defined by the projecting portion is a fluid discharge channel, the filtration filter is located on the fluid discharge side. The recessed portion enables the space that is surrounded by the at least one holding member and the filtration filter to be expanded. Consequently, an increase in the amount of the liquid enables the filtered object to be observed with the object immersed in the liquid with more certainty. Accordingly, the filtered object left on the filtration filter can be more successfully observed.

The filtration filter preferably includes a metallic porous film at least at a location at which the object to be filtered is filtered. The metallic porous film enables both main surfaces to be inhibited or prevented from having irregularities unlike a resin filter, and focus can be more readily adjusted when the filtered object left on the filtration filter is observed with, for example, an electron microscope.

The filtration filter is preferably flush or substantially flush (i.e., within 0.15 mm, and more preferably within 0.1 mm, of flush) with an opening plane that is defined by an end portion of the projecting portion of the at least one holding member. With this structure, focus can be more readily adjusted when the filtered object left on the filtration filter is observed with, for example, an electron microscope. In addition, the volume of the space that is surrounded by the holding member and the filtration filter can be further increased. This enables the filtered object to be observed with the object immersed in the liquid with more certainty. Accordingly, the filtered object left on the filtration filter can be more successfully observed.

The filtration filter device preferably further includes a first mount member that includes a recessed portion that is removably mountable on an outer circumferential surface of the projecting portion of the at least one holding member. With this structure, a tubular member that defines the fluid channel or a lid that covers the fluid channel, for example, can be removably mounted as the first mount member, and usability can be improved.

An external thread is preferably formed on the outer circumferential surface of the projecting portion of the at least one holding member. An internal thread is preferably formed on an inner circumferential surface of the recessed portion of the first mount member. The projecting portion of the at least one holding member and the recessed portion of the first mount member preferably have respective inclined surfaces that incline with respect to a screw direction in which the external thread is screwed into the internal thread at positions nearer than the external thread and the internal thread to the channel with the external thread screwed in the internal thread, and the inclined surfaces are in contact with each other. With this structure, the holding member and the first mount member can be removably mounted with more certainty in a manner in which the external thread is screwed into the internal thread. Since the inclined surface of the projecting portion of the holding member and the inclined surface of the first mount member are in contact with each other, the contact area can be larger than that in the case where surfaces that are perpendicular to the screw direction are in contact with each other. With this structure, even when the accuracy of processing is the same as the case where the perpendicular surfaces are in contact with each other, the area of close contact between the projecting portion of the holding member and the recessed portion of the first mount member can be substantially increased, and the sealability of the fluid channel can be further improved.

The filtration filter device preferably further includes a second mount member that includes an annular projecting portion that is removably mountable on an inner circumferential surface of the recessed portion of the at least one holding member. With this structure, a tubular member that defines the fluid channel or a lid that covers the fluid channel, for example, can be removably mounted as the second mount member, and the usability can be improved.

An internal thread is preferably formed on the inner circumferential surface of the recessed portion of the at least one holding member. An external thread is preferably formed on an outer circumferential surface of the projecting portion of the second mount member. The recessed portion of the at least one holding member and the projecting portion of the second mount member preferably have respective inclined surfaces that incline with respect to a screw direction in which the external thread is screwed into the internal thread at positions nearer than the internal thread and the external thread to the channel with the external thread screwed in the internal thread, and the inclined surfaces are in contact with each other. With this structure, the holding member and the second mount member can be removably mounted with more certainty in a manner in which the external thread is screwed into the internal thread. Since the inclined surface of the recessed portion of the holding member and the inclined surface of the projecting portion of the second mount member are in contact with each other, the contact area can be larger than that in the case where surfaces that are perpendicular to the screw direction are in contact with each other. With this structure, even when the accuracy of processing is the same as the case where the perpendicular surfaces are in contact with each other, the area of close contact between the recessed portion of the holding member and the projecting portion of the second mount member can be substantially increased, and the sealability of the fluid channel can be further improved.

The projecting portion of the at least one holding member preferably has a shape that enables the projecting portion to be mounted on the recessed portion of the at least one holding member. With this structure, a plurality of the holding members can be connected in series, for example, in a manner in which the holding members are stacked, and the projecting portion of one of the holding members that are adjacent to each other is mounted on the recessed portion of the other holding member. That is, whether the holding member is used or the holding members that are connected to each other are used can be selected depending on the use.

The at least one holding member preferably includes a plurality of holding members. It is preferable that, out of a pair of holding members that are adjacent to each other, a projecting portion of one of the holding members be removably mounted on a recessed portion of the other of the holding members. With this structure, a plurality of the filtration filters can be readily installed in and removed from the filtration filter device, and the usability can be improved. For example, the object to be filtered can be filtered with the filtration filters, and this decreases a variation in the size of the filtered object by one of the filtration filters that is located on the downstream side in the direction in which the fluid flows. In the case where the diameter of each through-hole is changed between the filtration filters, objects to be filtered having different sizes can be classified.

An external thread is preferably formed on an outer circumferential surface of the projecting portion of the one of the holding members. An internal thread is preferably formed on an inner circumferential surface of the recessed portion of the other of the holding members. The projecting portion of the one of the holding members and the recessed portion of the other of the holding members preferably have respective inclined surfaces that incline with respect to a screw direction in which the external thread is screwed into the internal thread at positions nearer than the external thread and the internal thread to the channel with the external thread screwed in the internal thread, and the inclined surfaces are in contact with each other. With this structure, the one of the holding members and the other holding member can be removably mounted with more certainty in a manner in which the external thread is screwed into the internal thread. Since the inclined surface of the projecting portion of the one of the holding members and the inclined surface of the recessed portion of the other holding member are in contact with each other, the contact area can be larger than that in the case where surfaces that are perpendicular to the screw direction are in contact with each other. With this structure, even when the accuracy of processing is the same as the case where the perpendicular surfaces are in contact with each other, the area of close contact between the projecting portion of the one of the holding members and the recessed portion of the other holding member can be substantially increased, and the sealability of the fluid channel can be further improved.

The at least one holding member preferably includes a first frame member and a second frame member that are capable of interposing the outer circumferential portion of the filtration filter therebetween. With this structure, the filtration filter can be readily replaced after the first frame member and the second frame member are separated from the outer circumferential portion.

A thickness of an outer circumferential portion of the first frame member preferably differs from a thickness of an outer circumferential portion of the second frame member. This enables the positions of the projecting portion and the recessed portion to be checked on the basis of the difference in the thickness between the outer circumferential portions of the first and second frame members even when the holding member is mounted on, for example, the first mount member and the projecting portion and the recessed portion cannot be recognized visually from the appearance of the filtration filter device.

The outer circumferential portion of the filtration filter preferably has a first bend and a second bend and is preferably held between the first frame member and the second frame member such that there is at least one elongated projection between the first bend and the second bend. With this structure, the filtration filter includes the elongated projection between the first bend and the second bend, and accordingly, frictional forces between the first frame member and the outer circumferential portion of the filtration filter and between the second frame member and the outer circumferential portion of the filtration filter can be increased. This increases forces at which the first frame member and the second frame member hold the filtration filter without increasing the number of components.

The at least one elongated projection preferably includes a plurality of elongated projections and the plurality of elongated projections are preferably disposed between the first bend and the second bend. The plurality of elongated projections preferably extend in irregular directions. This structure can increase the frictional forces between the first frame member and the outer circumferential portion of the filtration filter and between the second frame member and the outer circumferential portion of the filtration filter and further increase the forces at which the first frame member and the second frame member hold the filtration filter.

Embodiments of the present invention will hereinafter be described with reference to the drawings.

First Embodiment

FIG. 1 schematically illustrates a side view of the structure of a filtration filter device according to a first embodiment of the present invention.

Figure 2:
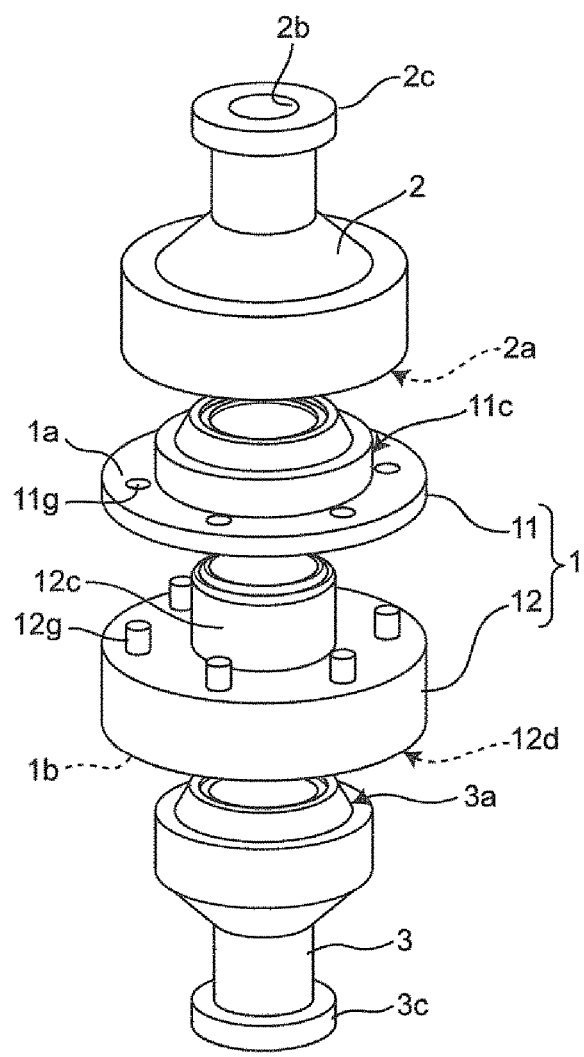
FIG. 2 is an exploded perspective view of the filtration filter device in FIG. 1.

FIG. 2 is an exploded perspective view of the filtration filter device in FIG. 1.

Figure 3:
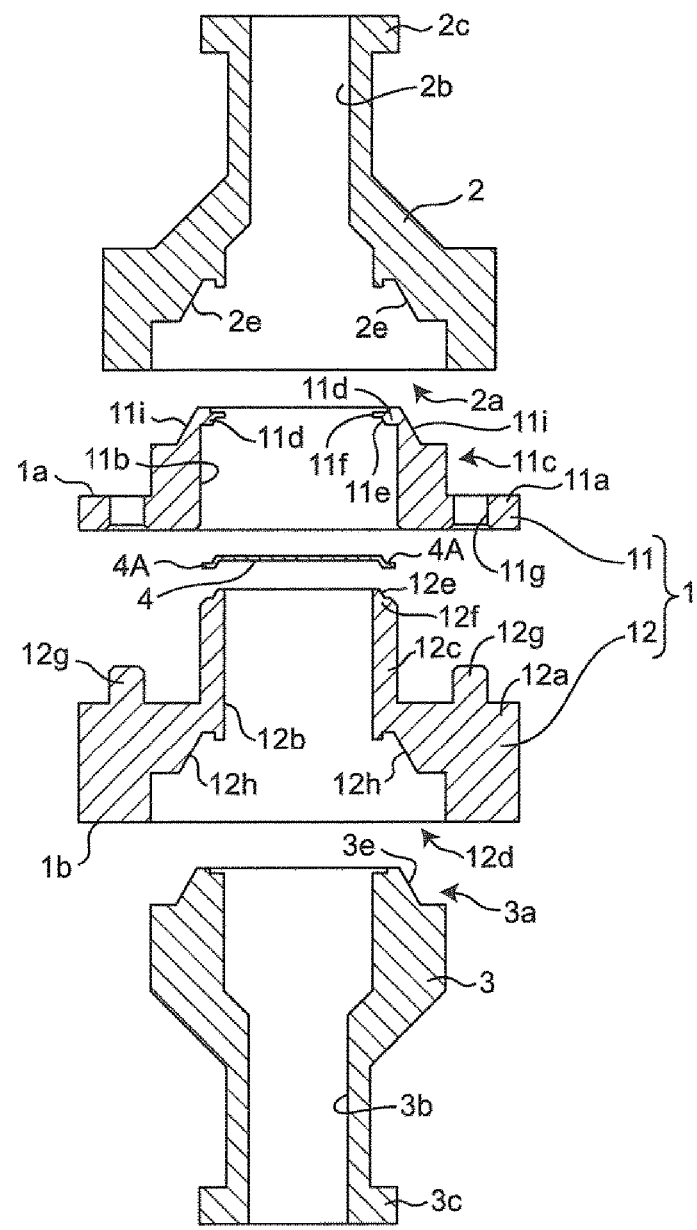
FIG. 3 is an exploded perspective view of a section of a part of the filtration filter device in FIG. 1.

FIG. 3 is an exploded perspective view of a section of a part of the filtration filter device in FIG. 1.

Figure 4:
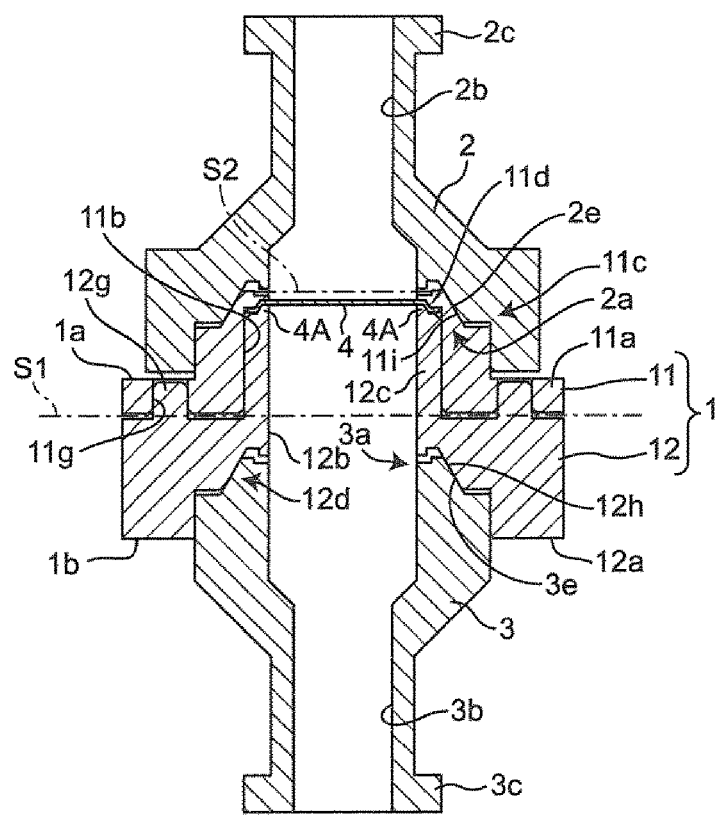
FIG. 4 is a sectional view of an assembly of the filtration filter device in FIG. 1.

FIG. 4 is a sectional view of an assembly of the filtration filter device in FIG. 1.

Figure 5:
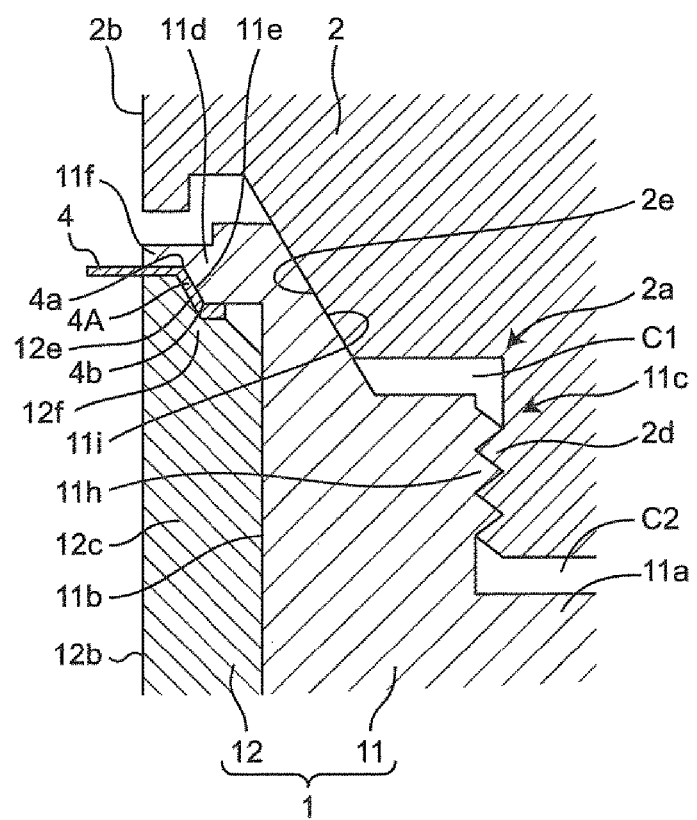
FIG. 5 is an enlarged sectional view of a part of FIG. 4.

FIG. 5 is an enlarged sectional view of a part of FIG. 4.

As illustrated in FIGS. 1 and 2, the filtration filter device according to the first embodiment of the present invention includes a holding member 1, a tubular member 2 that is removably mounted on one main surface 1a of the holding member 1, and a tubular member 3 that is removably mounted on the other main surface 1b of the holding member 1.

As illustrated in FIG. 3 and FIG. 4, the holding member 1 holds an outer circumferential portion 4A of a filtration filter 4 that filters an object contained in the fluid. According to the first embodiment, the holding member 1 includes a first frame member 11 and a second frame member 12. The first frame member 11 and the second frame member 12 are capable of interposing (holding) the outer circumferential portion 4A of the filtration filter 4 therebetween.

More specifically, the first frame member 11 includes an annular flat plate 11a and an annular projecting portion 11c that projects toward the tubular member 2 in the thickness direction of the holding member 1 around a central through-hole 11b. The diameter of the flat plate 11a is, for example, 18 mm. The thickness of the flat plate 11a is, for example, 0.9 mm. The diameter of the through-hole 11b is, for example, 8 mm. The height of the projecting portion 11c is, for example, 4.1 mm. The projecting portion 11c has an inclined surface 11i described in detail later.

An annular flange 11d that projects toward the center of the through-hole 11b is formed on the inner surface of the annular projecting portion 11c. The flange 11d is formed, for example, at a position 0.2 mm away from the top of the projecting portion 11c toward the flat plate 11a in the thickness direction of the holding member 1. The thickness of an end portion 11f of the flange 11d on the center side of the through-hole 11b decreases such that the flange 11d has an inclined surface 11e(see FIGS. 3 and 5) on the side facing the tubular member 3. The thickness of a portion of the flange 11d near the projecting portion 11c is, for example, 0.5 mm. The thickness of the end portion 11f of the flange 11d is, for example, 0.2 mm. The inclination angle of the inclined surface 11e is, for example, 60 degrees.

The second frame member 12 includes an annular flat plate 12a, an annular projecting portion 12c that projects toward the tubular member 2 in the thickness direction of the holding member 1 around a central through-hole 12b, and a recessed portion 12d that is recessed toward the tubular member 2 in the thickness direction of the holding member 1 around the central through-hole 12b. The diameter of the flat plate 12a is, for example, 18 mm. The thickness of the flat plate 12a is, for example, 4.9 mm. The diameter of the through-hole 12b is, for example, 6 mm. The height of the projecting portion 12c is, for example, 4.65 mm.

The projecting portion 12c has an outer diameter that is slightly smaller than the diameter of the through-hole 11b such that the projecting portion 12c can be inserted in the through-hole 11b of the first frame member 11. The shape of an end portion 12f of the projecting portion 12c matches the shape of the flange 11d on the side facing the tubular member 3. That is, the end portion 12f has an inclined surface 12e that corresponds to the inclined surface 11e(see FIG. 5).

As illustrated in FIG. 5, the filtration filter 4 is held with a tensile force applied thereto in a surface direction in a manner in which the outer circumferential portion 4A of the filtration filter 4 is interposed between the flange 11d of the first frame member 11 and the end portion 12f of the projecting portion 12c of the second frame member 12 and extends along the inclined surface 11e and the inclined surface 12e. The outer circumferential portion 4A of the filtration filter 4 is interposed at a position away from a central plane S1 (FIG. 4) with respect to the thickness direction of the holding member 1 in the thickness direction (i.e., the vertical direction of FIG. 4). According to the first embodiment, the filtration filter 4 is disposed inside the annular projecting portion 11c. The filtration filter 4 is substantially flush with an opening plane S2 (FIG. 4) that is defined by the end portion of the annular projecting portion 11c.

As illustrated in FIG. 3 and FIG. 4, the flat plate 11a of the first frame member 11 has through-holes 11g each of which extends therethrough in the thickness direction. The through-holes 11g are preferably arranged at regular intervals in the circumferential direction of the flat plate 11a. Conversely, the flat plate 12a of the second frame member 12 has pins 12g which project in the thickness direction. The pins 12g are arranged at regular intervals in the circumferential direction of the flat plate 12a at positions corresponding to the location of the through-holes 11g. The projecting portion 12c of the second frame member 12 is inserted in the through-hole 11b of the first frame member 11 and the pins 12g are inserted in respective through-holes 11g. Thus, the first frame member 11 and the second frame member 12 are secured to each other.

The tubular member 2 includes a recessed portion 2a (FIGS. 2 and 3) that is removably mountable on the projecting portion 11c of the first frame member 11. The recessed portion 2a has an inner diameter larger than the inner diameter of the projecting portion 11c. The tubular member 2 includes a hollow portion 2b that serves as a fluid channel. The tubular member 2 is mounted on the first frame member 11 such that the hollow portion 2b faces at least a part of one main surface of the filtration filter 4. This enables the fluid to be supplied to the filtration filter 4 via the hollow portion 2b that serves as a fluid supply channel. Alternatively, the fluid that has passed through the filtration filter 4 can be discharged via the hollow portion 2b which then serves as a fluid discharge channel.

As illustrated in FIG. 5, an internal thread 2d is formed on the inner circumferential surface of the recessed portion 2a of the tubular member 2. The recessed portion 2a of the tubular member 2 has an inclined surface (referred to below as an inclined inner circumferential surface) 2e at a position nearer than the internal thread 2d to the channel (hollow portion 2b). An external thread 11h that corresponds to the internal thread 2d is formed on the outer circumferential surface of the projecting portion 11c of the first frame member 11. The projecting portion 11c of the first frame member 11 has the inclined surface (referred to below as the inclined outer circumferential surface) 11i at a position nearer than the external thread 11h to a channel (through-hole 12b). The inclined inner circumferential surface 2e and the inclined outer circumferential surface 11i incline with respect to a screw direction (axial direction) in which the external thread 11h is screwed into the internal thread 2d.

The inclined inner circumferential surface 2e and the inclined outer circumferential surface 11i are tapered. The inclined inner circumferential surface 2e has an outer diameter smaller than that of the internal thread 2d so as to be surrounded by the internal thread 2d when viewed in the axial direction. The inclined outer circumferential surface 11i has an outer diameter smaller than that of the external thread 11h so as to be surrounded by the external thread 11h when viewed in the axial direction. As illustrated in FIG. 5, the inclined outer circumferential surface 11i of the projecting portion 11c of the first frame member 11 and the inclined inner circumferential surface 2e of the recessed portion 2a of the tubular member 2 are in contact with each other with the external thread 11h screwed in the internal thread 2d. The inclination angle of the inclined inner circumferential surface 2e and the inclined outer circumferential surface 11i is, for example, 60 degrees.

A gap C1 is formed between the internal thread 2d and the tubular member 2 in the screw direction (vertical direction in FIG. 5) and a gap C2 is formed between the external thread 11h and the first frame member 11 in the screw direction with the external thread 11h screwed in the internal thread 2d.

The tubular member 2 includes a Luer lock connector 2c. The Luer lock connector 2c has a form that meets a standard such as ISO594-2. According to the first embodiment, the connector 2c is formed of an annular projecting portion that projects outward from an end portion of the tubular member 2. For example, the tubular member 2 is mounted on a Luer lock syringe in a manner in which the connector 2c is screwed along a spiral groove (not illustrated) that is formed on the inner circumferential surface of a hollow end portion of the Luer lock syringe.

The tubular member 3 includes a projecting portion 3a that is removably mountable on the recessed portion 12d of the second frame member 12. The recessed portion 12d has an inner diameter larger than the inner diameter of the projecting portion 3a. The tubular member 3 includes a hollow portion 3b that serves as a fluid channel. The tubular member 3 is mounted on the second frame member 12 such that the hollow portion 3b faces at least a part of the other main surface of the filtration filter 4. This enables the fluid to be supplied to the filtration filter 4 via the hollow portion 3b that serves as the fluid supply channel.

Alternatively, the fluid that has passed through the filtration filter 4 can be discharged from the hollow portion 3b that serves as the fluid discharge channel.

The tubular member 3 includes a Luer lock connector 3c. The Luer lock connector 3c has a form that meets a standard such as ISO594-2. According to the first embodiment, the connector 3c is formed of an annular projecting portion that projects outward from an end portion of the tubular member 3. For example, the tubular member 3 is mounted on a Luer lock syringe in a manner in which the connector 3c is screwed along a spiral groove (not illustrated) that is formed on the inner circumferential surface of a hollow end portion of the Luer lock syringe.

Examples of the materials of the first frame member 11, the second frame member 12, and the tubular members 2 and 3 include metals such as duralumin and aluminum and resins such as polyethylene, polystyrene, polypropylene, polycarbonate, polyacetal, and polyetherimide.

According to the first embodiment, the object to be filtered is a biological substance contained a liquid. In the description, the "biological substance" means a substance derived from a living organism such as a cell (eukaryote), a bacterium (eubacteria), and a virus. Examples of the cell (eukaryote) include an ovum, a spermatozoon, an induced pluripotent stem cell (iPS cell), an ES cell, a stem cell, a mesenchymal stem cell, a mononuclear cell, a single cell, a cell mass, a floating cell, an adhesion cell, a nerve cell, a leukocyte, a lymphocyte, a cell for regenerative medicine, an autologous cell, a cancer cell, a circulating tumor cell (CTC), HL-60, HELA, and fungi. Examples of the bacterium (eubacteria) include a colon *bacillus* and a tubercle *bacillus*.

Figure 6:
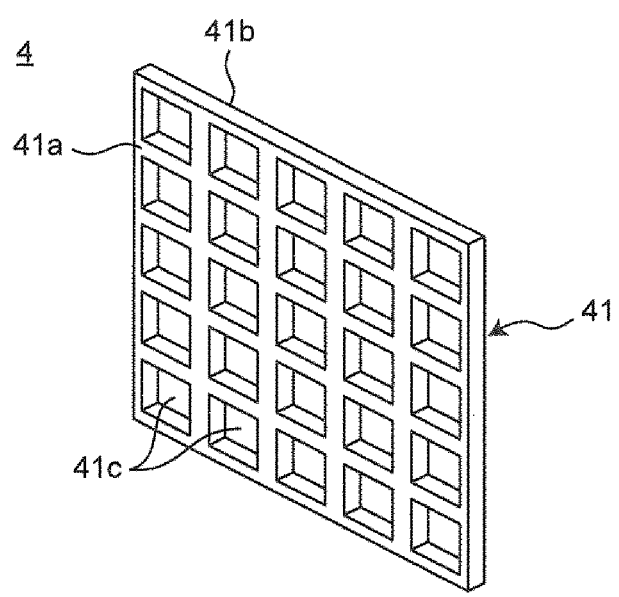
FIG. 6 schematically illustrates an enlarged perspective view of the structure of a part of a filtration filter.

FIG. 6 schematically illustrates an enlarged perspective view of the structure of a part of the filtration filter 4. As illustrated in FIG. 6, the filtration filter 4 includes a metallic porous film 41 that filters the object to be filtered from the fluid. It is not necessary for the entire filtration filter 4 to be formed of the metallic porous film 41 as long as the metallic porous film 41 is located at least at a location at which the object to be filtered is filtered.

As illustrated in FIG. 6, the metallic porous film 41 has a pair of main surfaces 41a and 41b that face each other. The metallic porous film 41 has through-holes 41c that extend between the main surfaces 41a and 41b so that the liquid may pass through the through-holes. When the liquid passes through the through-holes 41c the metallic porous film 41 captures the biological substances and isolated them from the liquid. The shape and dimensions of each through-hole 41c are appropriately determined in accordance with the shape and size of the biological substances. The through-holes 41c are arranged, for example, at regular intervals or in a periodical manner. For example, the shape of each through-hole 41c is a square, a regular hexagon, a circle, or an ellipse when viewed from the main surface 41a of the metallic porous film 41. According to the first embodiment, the through-holes 41c are arranged in the form of a square lattice. The size of each through-hole 41c is, for example, no less than 0.1 µm and no more than 500 µm in length and no less than 0.1 µm and no more than 500 µm in width when the shape of the through-hole 41c is a square. The distance between the adjoining through-holes 41c is, for example, more than the diameter of the opening of each through-hole 41c and is equal to or less than 10 times the diameter of the opening, and is more preferably equal to or less than 3 times the diameter of the opening. An opening ratio of the through-holes 41c to the metallic porous film 41 is, for example, 10% or more.

Examples of the material of the metallic porous film 41 include gold, silver, copper, platinum, nickel, stainless steel, palladium, titanium, cobalt, an alloy thereof, and an oxide thereof. The dimension of the metallic porous film 41 is, for example, 6 mm in diameter. The thickness of the metallic porous film 41 is, for example, no less than 0.1 µm and no more than 100 µm, preferably no less than 0.1 µm and no more than 50 µm. The shape of the metallic porous film 41 is, for example, circular, elliptic, or polygonal. According to the first embodiment, the shape of the metallic porous film 41 is circular. An outer circumferential portion of the metallic porous film 41 may have the through-holes 41c and may not have the through-holes 41c.

Figure 7:
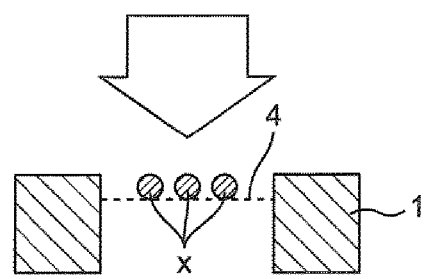
FIG. 7 schematically illustrates a side view of the filtration filter that is held on a fluid supply side by a holding member and that filters an object to be filtered that a fluid contains.
Figure 8:
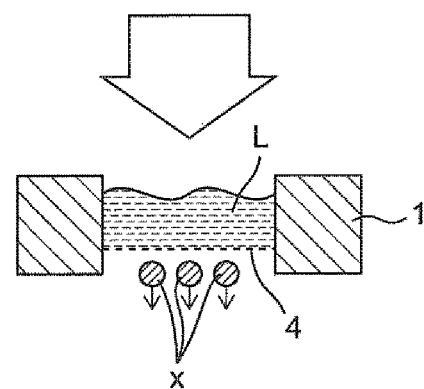
FIG. 8 schematically illustrates a side view of the filtration filter illustrated in FIG. 7 and illustrates backwashing in which a liquid is caused to flow in an opposite direction toward the filtered object by the filtration filter.
Figure 9:
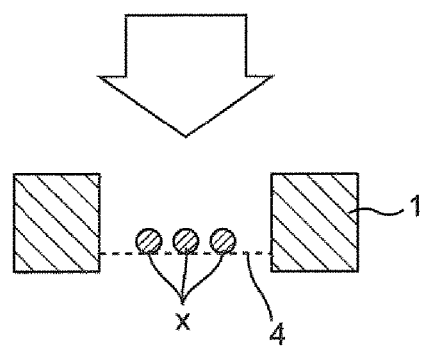
FIG. 9 schematically illustrates a side view of the filtration filter that is held on a fluid discharge side by the holding member and that filters an object to be filtered that a fluid contains.
Figure 10:
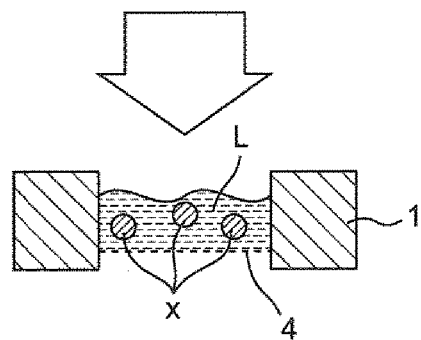
FIG. 10 schematically illustrates a side view of the filtration filter illustrated in FIG. 9 and illustrates the object to be filtered that floats in a liquid that is contained in a space surrounded by the filtration filter and the holding member.

As illustrated in FIG. 4, the filtration filter 4 is disposed inside the projecting portions 11c and 12c of the holding member 1. Accordingly, the filtration filter 4 is located away from the central plane S1 in the thickness direction of the holding member 1 (i.e., above the central plane S1 as viewed in FIG. 4) and is located on the fluid supply side or discharge side (depending on the flow direction of the liquid passing through the filtration filter device. That is, in the case where the fluid channel that is defined by the projecting portions 11c and 12c of the holding member 1 is the fluid supply channel, the filtration filter 4 is located on the fluid supply side. With this structure, as illustrated in FIG. 7, the focus of a microscope used to observe the objects x (typically a biological substance) captured by the filtration filter 4 can be properly adjusted to view the objects. As illustrated in FIG. 8, this structure is also advantageous for backwashing in which a fluid is caused to flow in an opposite direction toward the filtered objects x captured by the filtration filter 4 and subsequently, the objects are removed from the filtration filter 4. In the case where the fluid channel that is defined by the projecting portions 11c and 12c of the holding member 1 is the fluid discharge channel, the filtration filter 4 is located on the fluid discharge side. As illustrated in FIG. 9, the space that is surrounded by the holding member 1 and the filtration filter 4 can be expanded. With this structure, as illustrated in FIG. 10, an increase in the amount of a liquid L enables the filtered objects x to be observed (with the objects immersed in the liquid) with more certainty. Accordingly, better observation can be achieved, for example, by preventing the filtered objects x captured by the filtration filter 4 from drying or activation thereof. When the tubular member 2 is removed, the fluid is inhibited from overflowing from the space and the filtration filter 4 can filter the object to be filtered with more certainty.

According to the first embodiment, the filtration filter 4 includes the metallic porous film 41 located at least at the location at which the object to be filtered is filtered. The metallic porous film 41 inhibits or prevents both of its main surfaces from having irregularities, and the focus of the microscope used to observe the filtered object can be more readily adjusted.

According to the first embodiment, the filtration filter 4 is substantially flush with the opening plane S2 (FIG. 4) that is defined by the end portion of the annular projecting portion 11c. With this structure, the focus of the microscope used to observe the filtered objects can be more readily adjusted. In addition, the volume of the space that is surrounded by the holding member 1 and the filtration filter 4 can be further increased. This enables the filtration filter 4 to filter the object to be filtered with more certainty. The filtration filter 4 may be flush with the opening plane S2. In this case, the same effect as above can be achieved.

According to the first embodiment, the tubular member 2 includes the recessed portion 2a that is removably mountable on the outer circumferential surface of the projecting portion 11c of the holding member 1 and the usability can be improved. The first mount member that includes the recessed portion that is removably mountable on the outer circumferential surface of the projecting portion 11c of the holding member 1 is not limited to the tubular member 2, and may be a lid that covers the fluid channel. In this case, the lid is mounted to prevent the liquid contained in the space that is surrounded by the holding member 1 and the filtration filter 4 (e.g., FIG. 10) from leaking and this improves the usability of the filtration filter device.

According to the first embodiment, as illustrated in FIG. 5, the external thread 11h is formed on the outer circumferential surface of the projecting portion 11c of the holding member 1 and the internal thread 2d is formed on the inner circumferential surface of the recessed portion 2a of the tubular member 2. The inclined outer circumferential surface 11i of the projecting portion 11c of the holding member 1 and the inclined inner circumferential surface 2e of the recessed portion 2a of the tubular member 2 are in contact with each other with the external thread 11h screwed in the internal thread 2d. With this structure, the holding member 1 and the tubular member 2 can be removably mounted with more certainty in a manner in which the external thread 11h is screwed into the internal thread 2d. Since the inclined outer circumferential surface 11i of the projecting portion 11c of the holding member 1 and the inclined inner circumferential surface 2e of the recessed portion 2a of the tubular member 2 are in contact with each other, the contact area can be larger than that in the case where surfaces that are perpendicular to the screw direction are in contact with each other. With this structure, even when the accuracy of processing used to form the surfaces is the same as the case where the perpendicular surfaces are in contact with each other, the area of close contact between the projecting portion 11c of the holding member 1 and the recessed portion 2a of the tubular member 2 can be substantially increased, and the sealability of the fluid channel can be further improved.

According to the first embodiment, the gap C1 is formed between the external thread 11h and the tubular member 2 in the screw direction with the external thread 11h screwed in the internal thread 2d. The gap C1 makes it possible to increase an amount in which the external thread 11h is screwed into the internal thread 2d with the inclined outer circumferential surface 11i and the inclined inner circumferential surface 2e being in contact with each other. Consequently, the inclined outer circumferential surface 11i and the inclined inner circumferential surface 2e are in contact with each other at an increased pressure, the area of close contact between the tubular member 2 and the holding member 1 is further increased, and the sealability of the fluid channel can be further improved.

The gap C2 is preferably formed between the internal thread 2d and the holding member 1 in the screw direction. The gap C2 makes it possible to avoid a situation where the amount in which the external thread 11h is screwed into the internal thread 2d cannot be increased due to contact between the internal thread 2d and the holding member 1. When the external thread 11h is screwed into the internal thread 2d, it can be assumed that the inclined inner circumferential surface 2e and the inclined outer circumferential surface 11i are tightly in close contact with each other in a manner in which it is recognized that the amount of screwing cannot be increased with the gap C2 formed. In the case where the size of the gap C2 is larger than the predetermined size of the gap when the amount of screwing cannot be increased, it can be assumed that there is a possibility that a foreign substance is in the gap C1 or plural filtration filters 4 are interposed between the first frame member 11 and the second frame member 12. In the case where the gap C2 disappears when the amount of screwing can be increased, it can be assumed that there is a possibility that a space is formed between the inclined inner circumferential surface 2e and the inclined outer circumferential surface 11i or no filtration filter 4 is interposed between the first frame member 11 and the second frame member 12.

According to the first embodiment, the tubular member 3 includes the annular projecting portion 3a that is removably mountable on the inner circumferential surface of the recessed portion 12d of the holding member 1, and the usability can be improved. The second mount member that includes the projecting portion that is removably mountable on the inner circumferential surface of the recessed portion 12d of the holding member 1 is not limited to the tubular member 3, and may be a lid that covers the fluid channel. In this case, the lid is mounted to prevent the liquid from leaking with the liquid contained in the space that is surrounded by the holding member 1 and the filtration filter 4 as illustrated in, for example, FIG. 10, and this improves the usability.

An internal thread may be formed on the inner circumferential surface of the recessed portion 12d of the holding member 1, and an external thread may be formed on the outer circumferential surface of the projecting portion 3a of the tubular member 3 as with the description with reference to FIG. 5. The recessed portion 12d of the holding member 1 and the projecting portion 3a of the tubular member 3 may have respective inclined surfaces that incline with respect to the screw direction in which the external thread is screwed into the internal thread at positions nearer than the internal thread and the external thread to the channel, and the inclined surfaces may be in contact with each other. With this structure, the holding member 1 and the tubular member 3 can be removably mounted with more certainty in a manner in which the external thread is screwed into the internal thread. Since the inclined surface of the recessed portion 12d of the holding member 1 and the inclined surface of the projecting portion 3a of the tubular member 3 are in contact with each other, the contact area can be larger than that in the case where surfaces that are perpendicular to the screw direction are in contact with each other. With this structure, even when the accuracy of processing is the same as the case where the perpendicular surfaces are in contact with each other, the area of close contact between the recessed portion 12d of the holding member 1 and the projecting portion 3a of the tubular member 3 can be substantially increased, and the sealability of the fluid channel can be further improved.

A gap may be formed between the external thread and the holding member 1 in the screw direction with the external thread screwed in the internal thread as with the description with reference to FIG. 5. The gap makes it possible to increase an amount in which the external thread is screwed into the internal thread with the inclined surfaces being in contact with each other. Consequently, the inclined surfaces are in contact with each other at an increased pressure, the area of close contact between the tubular member 3 and the holding member 1 is further increased, and the sealability of the fluid channel can be further improved. A gap may be formed between the internal thread and the tubular member 3 in the screw direction. The gap makes it possible to avoid a situation where the amount of screwing cannot be increased due to contact between the internal thread and the tubular member 3. It can be assumed that the inclined surfaces are tightly in close contact with each other and that a foreign substance is between the external thread and the holding member 1 in a manner in which the size of the gap is checked.

According to the first embodiment, the holding member 1 includes the first frame member 11 and the second frame member 12 that are capable of interposing the outer circumferential portion 4A of the filtration filter 4 therebetween. With this structure, the filtration filter 4 can be readily replaced after the first frame member 11 and the second frame member 12 are separated from the outer circumferential portion.

According to the first embodiment, the thickness of the flat plate 11a that serves as the outer circumferential portion of the first frame member 11 preferably differs from the thickness of the flat plate 12a that serves as the outer circumferential portion of the second frame member 12. This enables the positions of the projecting portions 11c and 12c and the recessed portion 12d to be checked on the basis of the difference in the thickness between the flat plates 11a and 12a even when the holding member 1 is mounted on the tubular members 2 and 3 and the appearance of the projecting portions 11c and 12c and the recessed portion 12d cannot be recognized visually.

According to the first embodiment, the tubular members 2 and 3 include the Luer lock connectors 2c and 3c. This structure achieves, for example, direct mounting on a Luer lock syringe and improves the usability.

Figure 11:
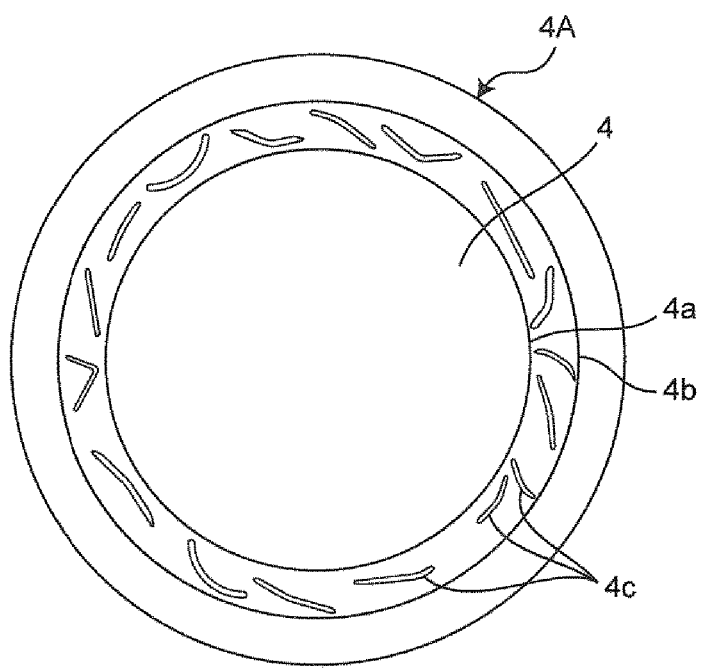
FIG. 11 schematically illustrates a plan view of a filtration filter according to a modification.

According to the first embodiment, as illustrated in FIG. 5, the inclined surface 11e of the first frame member 11 and the inclined surface 12e of the second frame member 12 interpose the outer circumferential portion 4A of the filtration filter 4 such that the outer circumferential portion 4A of the filtration filter 4 has a first bend 4a and a second bend 4b. At this time, as illustrated in FIG. 11, the outer circumferential portion 4A of the filtration filter 4 is preferably interposed such that there are elongated projections 4c between the first bend 4a and the second bend 4b. With this structure, the elongated projections 4c can increase frictional forces between the first frame member 11 and the outer circumferential portion 4A of the filtration filter 4 and between the second frame member 12 and the outer circumferential portion 4A of the filtration filter 4. This increases forces at which the first frame member 11 and the second frame member 12 hold the filtration filter 4 without increasing the number of components. Each elongated projection 4c protrudes from the one main surface of the filtration filter 4 and has a height that is no less than about 0.1 times the thickness of the filtration filter 4 and no more than about 2 times the thickness of the filtration filter 4.

As illustrated in FIG. 11, the elongated projections 4c are disposed between the first bend 4a and the second bend 4b. The elongated projections 4c preferably extend in irregular directions. This structure can increase the frictional forces between the first frame member 11 and the outer circumferential portion 4A of the filtration filter 4 and between the second frame member 12 and the outer circumferential portion 4A of the filtration filter 4 and further increase the forces at which the first frame member 11 and the second frame member 12 hold the filtration filter 4.

The elongated projections 4c may be formed of wrinkles of the metallic porous film 41. The "wrinkles" described herein means fine creases that are produced when the metallic porous film 41 becomes loose or shrinks. In this case, the metallic porous film 41 itself can form the elongated projections 4c, and there is no need for additional members for the elongated projections 4c.

The present invention is not limited to the present embodiment and can be carried out with other embodiments. For example, in the above description, the object to be filtered is the biological substance that the liquid contains. The present invention, however, is not limited thereto. The object to be filtered may be a substance that a gas contains. That is, the object to be filtered may be, for example, PM2.5 that air contains, provided that the object to be filtered is a substance that a fluid contains.

In the above description, the filtration filter 4 is used to filter biological substances from the liquid. The present invention, however, is not limited thereto. For example, the filtration filter 4 may be used to concentrate a liquid.

In the above description, the tubular member 2 is removably mounted on one main surface 1a of the holding member 1. The present invention, however, is not limited thereto. For example, the tubular member 2 may be removably mounted on a side surface of the holding member 1.

Second Embodiment

Figure 12:
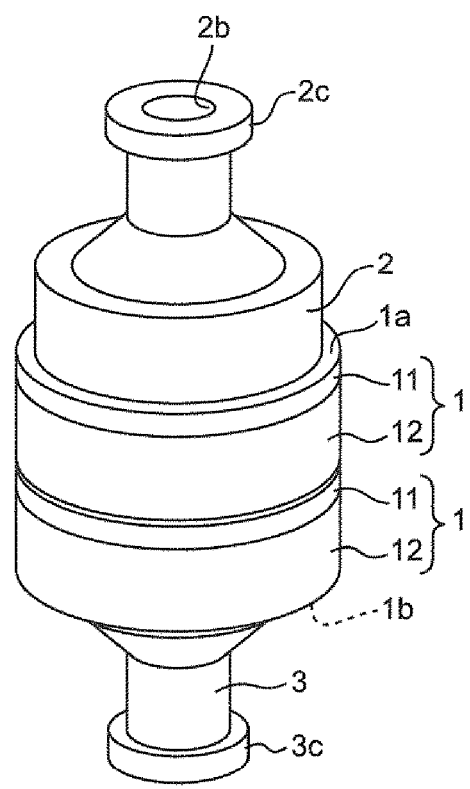
FIG. 12 schematically illustrates a perspective view of the structure of a filtration filter device according to a second embodiment of the present invention.
Figure 13:
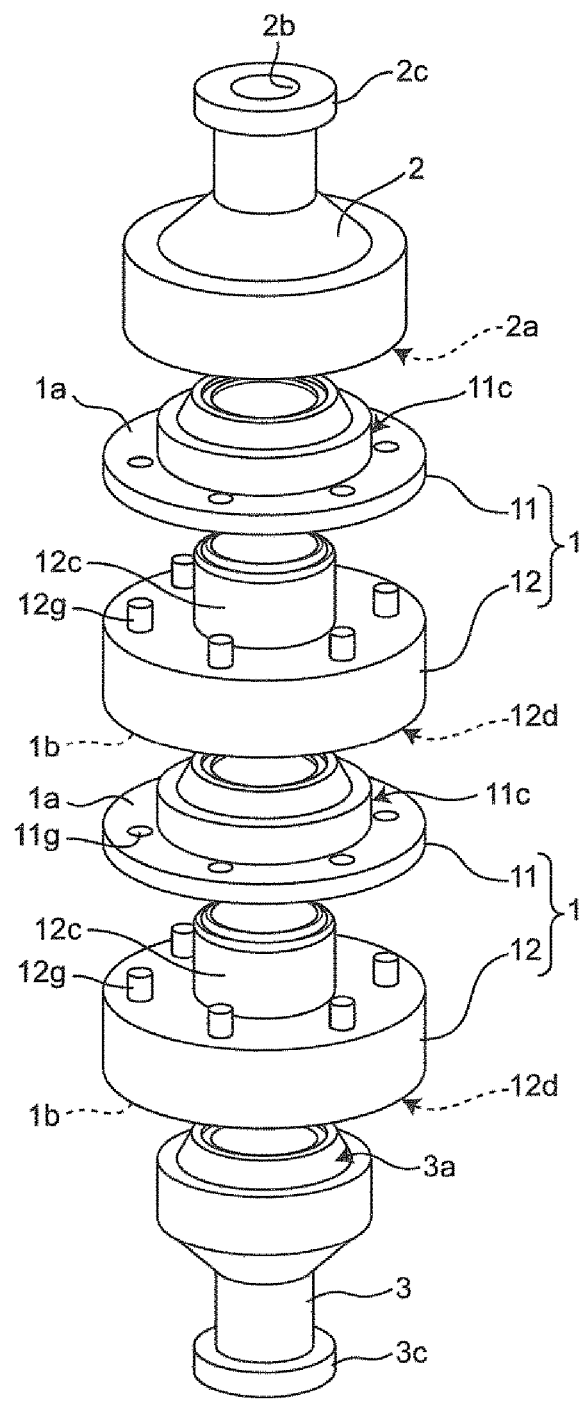
FIG. 13 is an exploded perspective view of the filtration filter device in FIG. 12.

FIG. 12 schematically illustrates a perspective view of the structure of a filtration filter device according to a second embodiment of the present invention. FIG. 13 is an exploded perspective view of the filtration filter device in FIG. 12.

The filtration filter device according to the second embodiment differs from the filtration filter device according to the first embodiment in including two holding members 1. Components like or similar to the components described according to the first embodiment are designated by like reference numbers, and a duplicated description is omitted.

The two holding members 1 are removably mounted on each other. According to the second embodiment, the projecting portion 11c of the first frame member 11 has a shape that enables the projecting portion 11c to be mounted on the recessed portion 12d of the second frame member 12 (see FIG. 3 and FIG. 4). That is, the projecting portion 11c of the first frame member 11 and the projecting portion 3a of the tubular member 3 have the same shape. The recessed portion 12d of the second frame member 12 and the recessed portion 2a of the tubular member 2 (see FIG. 3 and FIG. 4) have the same shape.

According to the second embodiment, two filtration filters 4 can be readily installed in and removed from the filtration filter device that includes the two holding members 1 that are mountable on and removable from each other, and the usability can be improved. For example, the object to be filtered can be filtered with the two filtration filters 4, and this decreases a variation in the size of the filtered object by one of the two filtration filters 4 that is located on the downstream side in the direction in which the fluid flows. In the case where the diameter of each through-hole is changed between the filtration filters 4 that are held by the holding members 1, objects to be filtered having different sizes can be classified.

According to the second embodiment, since the projecting portion 11c of the first frame member 11 has a shape that enables the projecting portion 11c to be mounted on the recessed portion 12d of the second frame member 12, three or more holding members 1 can be connected in series, for example, in a manner in which the three or more holding members 1 are stacked, and the projecting portion 11c of one of the holding members 1 that are adjacent to each other is mounted on the recessed portion 12d of the other holding member 1. That is, whether the holding member 1 is used or the holding members 1 that are connected to each other are used can be selected depending on the use. The number and order of the holding members 1 and the kind (for example, the diameter of each through-hole, the opening ratio, and the material) of the filtration filters 4 can be optionally changed depending on the object to be filtered, and the usability can be greatly improved.

According to the second embodiment, as illustrated in FIG. 4, since the filtration filters 4 are disposed inside the projecting portions 11c and 12c of the holding members 1, the filtration filter 4 that is held by one of the holding members 1 can be prevented from damaging due to contact with the projecting portions 11c and 12c of the other holding member 1 when the holding members 1 are connected in series.

An external thread may be formed on the outer circumferential surface of the projecting portion 11c of one of the holding members 1, and an internal thread may be formed on the inner circumferential surface of the recessed portion 12d of the other holding member 1 as with the description with reference to FIG. 5. The projecting portion 11c of the one of the holding members 1 and the recessed portion 12d of the other holding member 1 may have respective inclined surfaces that incline with respect to the screw direction in which the external thread is screwed into the internal thread at positions nearer than the internal thread and the external thread to the channel, and the inclined surfaces may be in contact with each other. With this structure, the one of the holding members 1 and the other holding member 1 can be removably mounted with more certainty in a manner in which the external thread is screwed into the internal thread. Since the inclined surface of the projecting portion 11c of the one of the holding members 1 and the inclined surface of the recessed portion 12d of the other holding member 1 are in contact with each other, the contact area can be larger than that in the case where surfaces that are perpendicular to the screw direction are in contact with each other. With this structure, even when the accuracy of processing is the same as the case where the perpendicular surfaces are in contact with each other, the area of close contact between the projecting portion 11c of the one of the holding members 1 and the recessed portion 12d of the other holding member 1 can be substantially increased, and the sealability of the fluid channel can be further improved.

A gap may be formed between the external thread and the other holding member 1 in the screw direction with the external thread screwed in the internal thread as with the description with reference to FIG. 5. The gap makes it possible to increase the amount in which the external thread is screwed into the internal thread with the inclined surfaces being in contact with each other. Consequently, the inclined surfaces are in contact with each other at an increased pressure, the area of close contact between the one of the holding members 1 and the other holding member 1 is further increased, and the sealability of the fluid channel can be further improved. A gap may be formed between the internal thread and the one of the holding members 1 in the screw direction. The gap makes it possible to avoid a situation where the amount of screwing cannot be increased due to contact between the internal thread and the one of the holding members 1. It can be assumed that the inclined surfaces are tightly in close contact with each other and that a foreign substance is between the internal thread and the other holding member 1 in a manner in which the size of the gap is checked.

Third Embodiment

Figure 14:
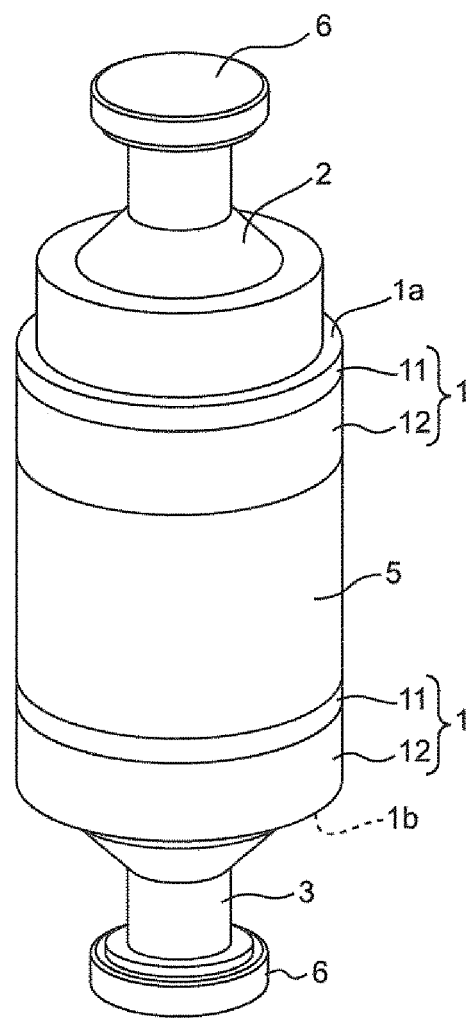
FIG. 14 schematically illustrates a side view of the structure of a filtration filter device according to a third embodiment of the present invention.
Figure 15:
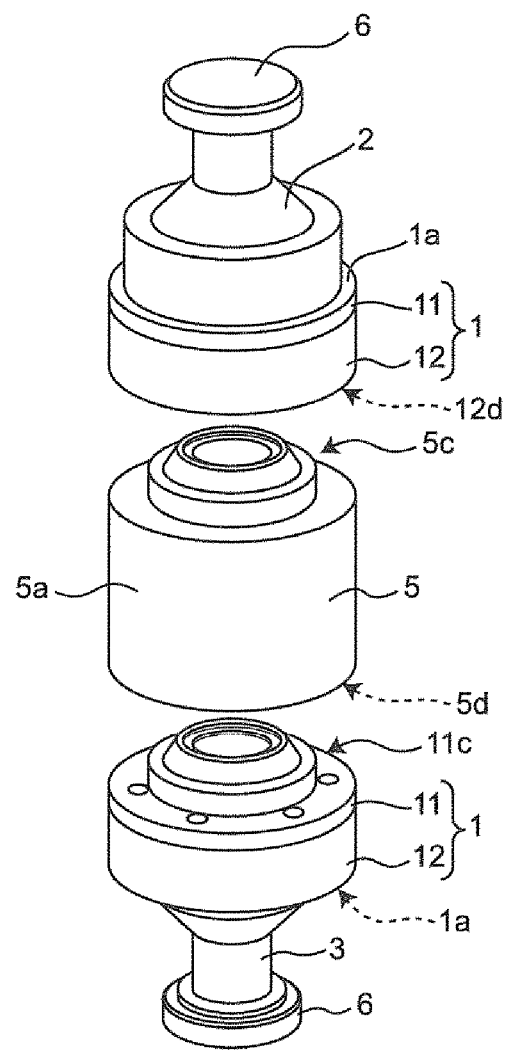
FIG. 15 is an exploded perspective view of a part of the filtration filter device in FIG. 14.
Figure 16:
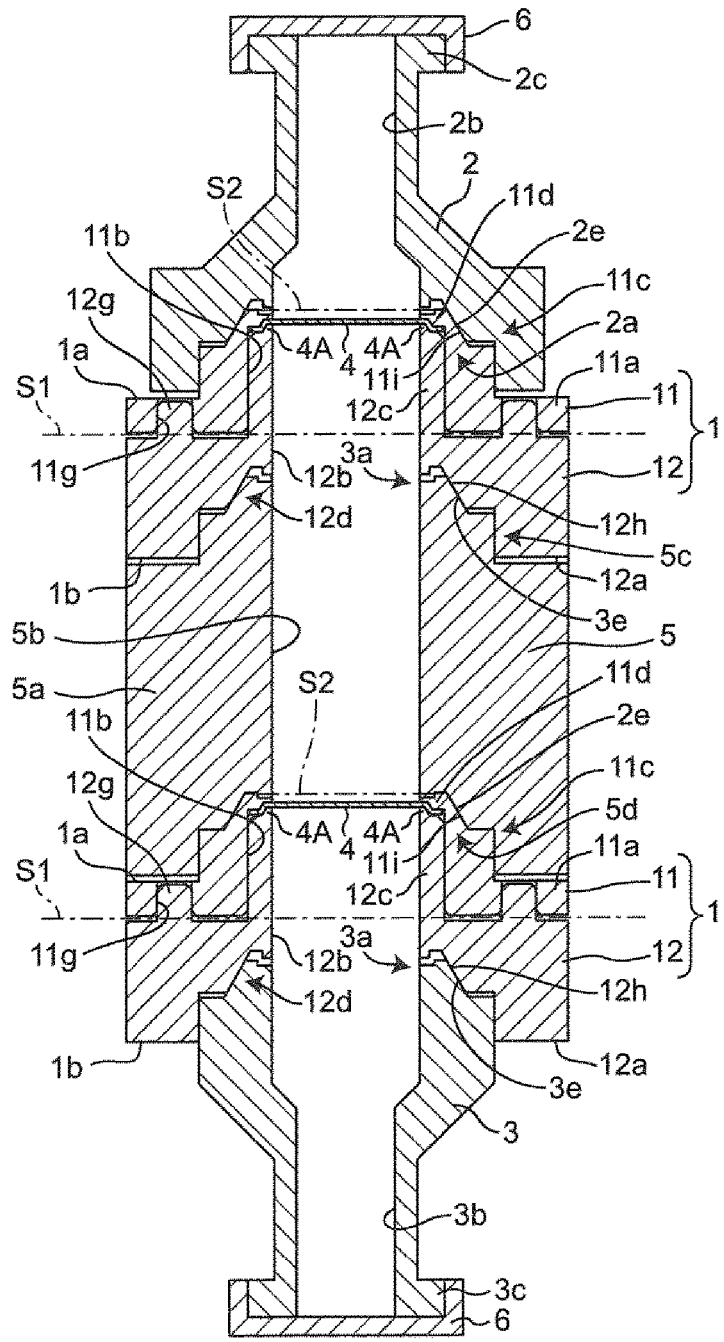
FIG. 16 is a sectional view of the filtration filter device in FIG. 14.

FIG. 14 schematically illustrates a side view of the structure of a filtration filter device according to a third embodiment of the present invention. FIG. 15 is an exploded perspective view of a part of the filtration filter device in FIG. 14. FIG. 16 is a sectional view of the filtration filter device in FIG. 14.

The filtration filter device according to the third embodiment differs from the filtration filter device according to the second embodiment in that a spacer 5 is disposed between the two the holding members 1 and lids 6 are removably mounted on the connectors 2c and 3c of the tubular members 2 and 3. Components like or similar to the components described according to the first embodiment are designated by like reference numbers, and a duplicated description is omitted.

As illustrated in FIG. 14 to FIG. 16, the spacer 5 includes a tubular portion 5a, an annular projecting portion 5c that projects toward one of the holding members 1 around a hollow portion 5b, and a recessed portion 5d that is recessed toward the one of the holding members 1 around the hollow portion 5b. The diameter of the tubular portion 5a is, for example, 18 mm. The thickness (height) of the tubular portion 5a is, for example, 15 mm.

The projecting portion 5c of the spacer 5 has a shape that enables the projecting portion 5c to be mounted on the recessed portion 12d of the second frame member 12 (see FIG. 3 and FIG. 4). That is, the projecting portion 5c of the spacer 5, the projecting portion 11c of the first frame member 11, and the projecting portion 3a of the tubular member 3 have the same shape.

The recessed portion 5d of the spacer 5 has a shape that enables the projecting portion 11c of the first frame member 11 and the projecting portion 3a of the tubular member 3 to be mounted therein (see FIG. 3 and FIG. 4). That is, the recessed portion 5d of the spacer 5, the recessed portion 12d of the second frame member 12, and the recessed portion 2a of the tubular member 2 have the same shape.

Examples of the material of the spacer 5 include metals such as duralumin and aluminum and resins such as polyethylene, polystyrene, polypropylene, polycarbonate, polyacetal, and polyetherimide.

According to the third embodiment, the spacer 5 enables the distance between the two holding members 1 (that is, the length of the channel) to be adjusted by the thickness of the spacer. For example, the hollow portion 5b of the spacer 5 can function as a buffer that temporally stores the fluid. The holding members 1 and the spacer 5 are combined depending on the use, and this further improves the usability.

According to the third embodiment, since the lids 6 are mounted on the connectors 2c and 3c of the tubular members 2 and 3, for example, the filtration filter device can be removed from a fluid-supplying apparatus or another apparatus and carried with the fluid contained in the channel. In addition, the object to be filtered that the fluid contains can be diffused for filtering in a manner in which the filtration filter device is shaken in the direction in which the channel extends with the lids 6 mounted on the connectors 2c and 3c of the tubular members 2 and 3. This further improves the usability.

Instead of disposing the spacer 5 between the two holding members 1, it can be disposed between the tubular member 2 and the holding members 1 or between the tubular member 3 and the holding members 1.

Fourth Embodiment

Figure 17:
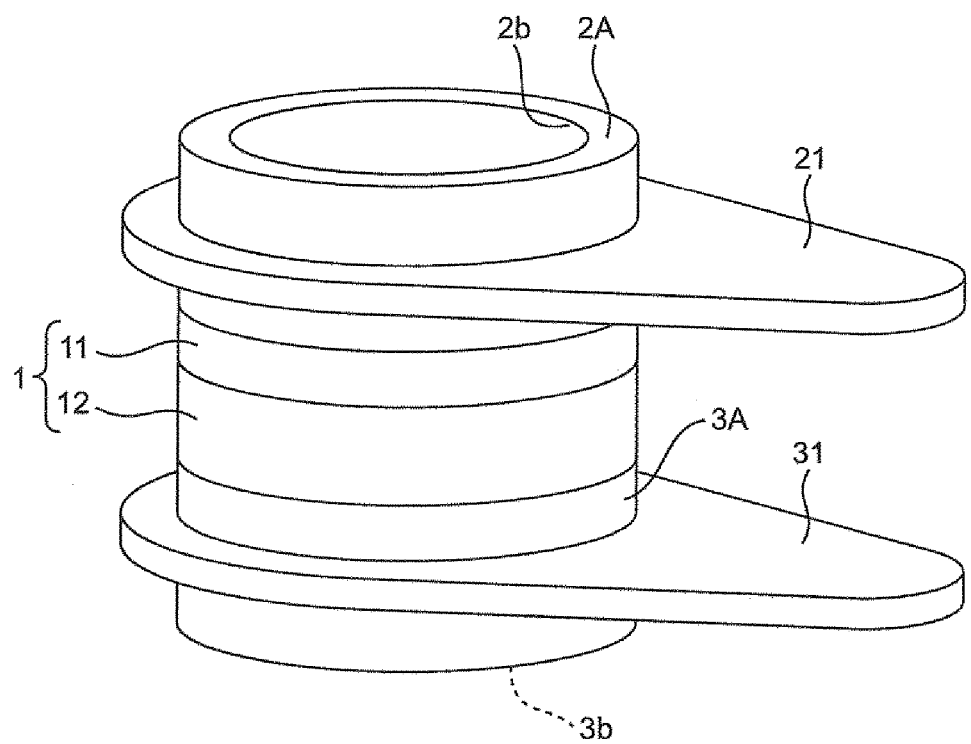
FIG. 17 schematically illustrates a perspective view of the structure of a filtration filter device according to a fourth embodiment of the present invention.

FIG. 17 schematically illustrates a perspective view of the structure of a filtration filter device according to a fourth embodiment of the present invention.

The filtration filter device according to the fourth embodiment differs from the filtration filter device according to the first embodiment in that tubular members 2A and 3A include handles 21 and 31. Components like or similar to the components described according to the first embodiment are designated by like reference numbers, and a duplicated description is omitted.

As illustrated in FIG. 17, the handle 21 extends sideways (direction intersecting the thickness direction of the holding member 1) from the outer circumferential surface of the main body of the tubular member 2A. Similarly, the handle 31 extends sideways (direction intersecting the thickness direction of the holding member 1) from the outer circumferential surface of the main body of the tubular member 3A.

According to the fourth embodiment, the tubular members 2A and 3A include the handles 21 and 31. Accordingly, an operator performs an filtering operation while holding the handles 21 and 31, and this inhibits the fingers of the operator from touching the filtration filter 4. In addition, the fluid that contains the object to be filtered can be inhibited from coming into contact with the fingers of the operator during the filtering operation. Furthermore, the operator can hold the handles 21 and 31 while having a protector on the fingers of the operator, and the operator is less likely to fail to hold the filtration filter device on the fingers during the filtering operation.

According to the fourth embodiment, the tubular members 2A and 3A include the handles 21 and 31. The present invention, however, is not limited thereto. Only the tubular member 2A may include the handle 21. Alternatively, only the tubular member 3A may include the handle 31. That is, either one of the two tubular members may include the handle.

As illustrated in FIG. 17, the diameters of the outer circumferential surfaces of the tubular members 2A and the 3A may be equal or substantially equal to the diameter of the outer circumferential surface of the holding member 1.

An appropriate combination of embodiments among the above embodiments can achieve the same effects as the embodiments achieve.

Although the present invention is sufficiently described with reference to the accompanying drawings in relation to the preferred embodiments, various modifications and alterations are obvious for a person skilled in the art. It should be understood that the modifications and alterations are included in the present invention recited by the accompanying claims without departing from the scope of the present invention.

The present invention is useful as a filtration filter device that filters the object to be filtered that the fluid contains, such as biological substances or PM2.5 because the filtered object left on the filtration filter can be more readily observed.

REFERENCE SIGNS LIST 1 holding member
1a one main surface
1b the other main surface
2 tubular member
2a recessed portion
2b hollow portion
2c connector (Luer lock connector)
2d internal thread
2e inclined surface (inclined inner circumferential surface)
3 tubular member
3a projecting portion
3b hollow portion
3c connector (Luer lock connector)
4 filtration filter
4A outer circumferential portion
4a first bend
4b second bend
4c elongated projection
5 spacer
5a tubular portion
5b hollow portion
5c projecting portion
5d recessed portion
6 lid
11 first frame member
11a flat plate
11b through-hole
11c projecting portion
11d flange
11e inclined surface
11f end portion
11g through-hole
11h external thread
11i inclined surface (inclined outer circumferential surface)
12 second frame member
12a flat plate
12b through-hole
12c projecting portion
12d recessed portion
12e inclined surface
12f end portion
12g pin
41 metallic porous film
41a, 41b main surface
41c through-hole

The invention claimed is:

1. A filtration filter device having an annular fluid flow channel having a central flow axis, the filtration filter device comprising:
   (a) a filtration filter for filtering an object contained in a fluid which passes through the fluid flow channel; and
   (b) a holding member that defines a portion of the fluid flow channel and holds an outer peripheral portion of the filtration filter, the holding member including first and second frame members:
      (i) the second frame member having a second clamping surface located radially outward of the fluid flow channel and being inclined at an oblique angle with respect to the central flow axis; and
      (ii) the first frame member surrounding at least a portion of the second frame member and having a first clamping surface located radially outward of the fluid flow channel and being inclined at an oblique angle with respect to the central flow axis, the outer peripheral portion of the filtration filter extending between the first and second clamping surfaces; and
   (c) a tubular member which surrounds at least a portion of the first frame member, the tubular member and the first frame member having opposed surfaces which cooperate to urge the first and second clamping surfaces toward one another along a direction perpendicular to the central flow axis when the tubular member and the first frame member are urged toward each other along the central flow axis such that the outer peripheral portion of the filtration filter is clamped between the first and second clamping surfaces.

2. The filtration filter device according to claim 1, wherein the opposed surfaces of the first frame member and the tubular member extend in a direction parallel to one another and form an oblique angle with respect to the central flow axis such that when the tubular member is urged against the first frame member in a direction parallel to the central flow axis, the first clamping surface is urged toward the second clamping surface.

3. The filtration filter device according to claim 2, wherein the tubular member and the first frame member are coupled to one another by mating threads and the tubular member is urged against the first frame member in a direction parallel to the central flow axis by rotating the threads relative to one another.

4. The filtration filter device according to claim 3, wherein the tubular member and the filtration filter device further comprises a second tubular member which defines a portion of the fluid flow channel and is removably attached to the second frame member.

5. The filtration filter device according to claim 4, wherein the second tubular member is removably attached to an inner circumferential surface of the second frame member, the inner circumferential surface of the second frame member forming an oblique angle with respect to the central flow axis and mating with a corresponding outer circumferential surface of the second tubular member.

6. The filtration filter device according to claim 5, wherein the inner circumferential surface of the second frame member and the outer circumferential surface of the second tubular member are conical frustums.

7. The filtration filter device according to claim 2, wherein the opposed surfaces and the first and second clamping surfaces are all conical frustums.

8. The filtration filter device according to claim 7, wherein the abutting surfaces and the first and second clamping surfaces all form the same angle with respect to the central flow axis.

9. The filtration filter device according to claim 1, wherein the first and second clamping surfaces are conical frustums.

10. The filtration filter device according to claim 1, wherein the filtration filter is a first filtration filter, the holding member is a first holding member, and the tubular member is a first tubular member, and the filtration filter device further comprises:
   (a) a second filtration filter for further filtering the fluid which passes through the fluid flow channel and has already been filtered by the first filtration filter; and
   (b) a second holding member that defines a portion of the fluid flow channel and holds an outer peripheral portion of the second filtration filter, the second holding member including third and fourth frame members:
      (i) the fourth frame member having a fourth clamping surface located radially outward of the fluid flow channel and being inclined with respect to the central flow axis; and
      (ii) the third frame member surrounding at least a portion of the fourth frame member and having a third clamping surface located radially outward of the fluid flow channel and being inclined with respect to the central flow axis, the outer peripheral portion of the filtration filter extending between the third and fourth clamping surfaces; and
   (c) a second tubular member defining a portion of the fluid flow channel located between the first and second holding members, the second tubular member connecting the first and second holding members.

11. The filtration filter device according to claim 1, wherein a portion of the filtration filter located in the fluid flow channel is a metallic porous film.

12. The filtration filter device according to claim 1, wherein a portion of the filtration filter located in the fluid flow channel has a surface which lies in a plane extending perpendicular to the central flow axis.

13. The filtration filter device according to claim 1, wherein the tubular member is removably mounted on the holding member.

14. The filtration filter device according to claim 1, wherein the outer peripheral portion of the filtration filter has at least two wrinkles formed therein, the wrinkles being located between the first and second clamping surfaces.

15. The filtration filter device according to claim 1, wherein the first and second clamping surfaces extend parallel to one another.

* * * * *